United States Patent
Adda et al.

(10) Patent No.: US 9,092,356 B2
(45) Date of Patent: *Jul. 28, 2015

(54) EXECUTING A KERNEL DEVICE DRIVER AS A USER SPACE PROCESS

(71) Applicant: INTERNATIONAL BUSINESS MACHINES CORPORATION, Armonk, NY (US)

(72) Inventors: Michael Adda, Tel Aviv (IL); Dan Aloni, Rishon Le-Zion (IL); Avner Braverman, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/457,203

(22) Filed: Aug. 12, 2014

(65) Prior Publication Data

US 2014/0351831 A1    Nov. 27, 2014

Related U.S. Application Data

(63) Continuation of application No. 12/949,132, filed on Nov. 18, 2010, now Pat. No. 8,806,511.

(51) Int. Cl.
```
G06F 9/54      (2006.01)
G06F 13/10     (2006.01)
G06F 11/07     (2006.01)
G06F 11/14     (2006.01)
G06F 9/48      (2006.01)
```
(52) U.S. Cl.
CPC .............. *G06F 13/102* (2013.01); *G06F 9/4843* (2013.01); *G06F 9/541* (2013.01); *G06F 9/545* (2013.01); *G06F 11/0715* (2013.01); *G06F 11/0793* (2013.01); *G06F 11/1412* (2013.01)

(58) Field of Classification Search
CPC .......... G06F 13/102; G06F 2003/0697; G06F 2009/45579

See application file for complete search history.

(56) References Cited

U.S. PATENT DOCUMENTS

| | | | |
|---|---|---|---|
| 6,212,574 B1 | 4/2001 | O'Rourke et al. | |
| 7,581,051 B2 | 8/2009 | Talluri et al. | |
| 7,603,484 B2 | 10/2009 | Dai et al. | |
| 8,806,511 B2* | 8/2014 | Adda et al. | 719/321 |
| 2002/0152331 A1 | 10/2002 | Wong et al. | |
| 2006/0253859 A1 | 11/2006 | Dai et al. | |
| 2008/0065839 A1 | 3/2008 | Pope et al. | |
| 2009/0089816 A1 | 4/2009 | Kim et al. | |
| 2009/0138625 A1 | 5/2009 | Lee et al. | |

(Continued)

OTHER PUBLICATIONS

Dario Maggiorini et al., "Running Device Drivers as User-Level Applications," Source: Proc. Workshop Sistemi Distribuiti: Algoritmi, Architetture e Linguaggi (W SDAAL 2001), Como (Italy), Sep. 10-12, 2001. Publisher: Universita degli studi di Milano, Italy.

(Continued)

*Primary Examiner* — Brian W Wathen
(74) *Attorney, Agent, or Firm* — Griffiths & Seaton PLLC

(57) ABSTRACT

A method, including receiving, by a user space driver framework (UDF) library executing from a user space of a memory over a monolithic operating system kernel, a kernel application programming interface (API) call from a device driver executing from the user space. The UDF library then performs an operation corresponding to the kernel API call.

10 Claims, 3 Drawing Sheets

(56) References Cited

U.S. PATENT DOCUMENTS

| | | |
|---|---|---|
| 2009/0153540 A1 | 6/2009 | Blinzer et al. |
| 2009/0158299 A1 | 6/2009 | Carter |
| 2009/0204978 A1 | 8/2009 | Lee et al. |
| 2009/0296685 A1 | 12/2009 | O'Shea et al. |

OTHER PUBLICATIONS

Leslie, B. et al., "User-Level Device Drivers: Achieved Performance," Source: Journal of Computer Science and Technology (English Language Edition), v 20, n. 5, 654-64, Sep. 2005. Publisher: Science Press, China.

Love, R., "Linus Kernel Development," 2nd Edition (2005), pp. 50-59 [retrieved from http://academic.safaribooksonline.com/0672327201].

Herder, J.N. et al., "Construction of a Highly Dependable Operating System," Source: Proceedings. 6th European Dependable Computing Conference, 10 pp., 2006. Publisher: IEEE.

"UIO: user-space drivers," May 2, 2007, Eklektix, Inc. URL: http://lwn.net/Articles/232575/.

Wikipedia, "Monolithic Kernel" (Oct. 31, 2010) [retrieved from http://en.wikipedia.org/w/index.php?title=Monolithic_kernel&oldid=394005606].

* cited by examiner

EXECUTING A KERNEL DEVICE DRIVER AS A USER SPACE PROCESS

CROSS REFERENCE TO RELATED APPLICATIONS

The present Application is a Continuation of copending U.S. patent application Ser. No. 12/949,132, filed Nov. 18, 2010.

FIELD OF THE INVENTION

The present invention relates generally to operating systems, and specifically to a software framework that enables kernel device drivers to execute as user-space processes.

BACKGROUND OF THE INVENTION

Operating systems are computer programs which manage the way software applications utilize the hardware of computer systems. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Operating systems typically segregate virtual memory into kernel space and user space. User space is typically the virtual memory region for running user applications, while the kernel space is typically reserved for running the kernel and extensions to the kernel.

SUMMARY OF THE INVENTION

There is provided, in accordance with an embodiment of the present invention a method, including receiving, by a user space driver framework (UDF) library executing from a user space of a memory over a monolithic operating system kernel, a kernel application programming interface (API) call from a device driver executing from the user space, and performing, by the UDF library, an operation corresponding to the kernel API call.

There is also provided, in accordance with an embodiment of the present invention a computer program product, the computer program product including a non-transitory computer readable storage medium having computer readable program code embodied therewith, the computer readable program code including computer readable program code configured to receive, by a user space driver framework (UDF) library executing from a user space of a memory over a monolithic operating system kernel, a kernel application programming interface (API) call from a device driver executing from the user space, and computer readable program code configured to perform, by the UDF library, an operation corresponding to the kernel API call.

There is further provided, in accordance with an embodiment of the present invention a method, including identifying two or more ports of a same type in a computer, initiating a separate device driver process for each of the identified ports, and establishing a one-to-one correspondence between each of the ports and each of the device driver processes.

There is additionally provided, in accordance with an embodiment of the present invention a computer program product, the computer program product including a non-transitory computer readable storage medium having computer readable program code embodied therewith, the computer readable program code including computer readable program code configured to identify two or more ports of a same type in a computer, computer readable program code configured to initiate a separate device driver process for each of the identified ports, and computer readable program code configured to establish a one-to-one correspondence between each of the ports and each of the device driver processes.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
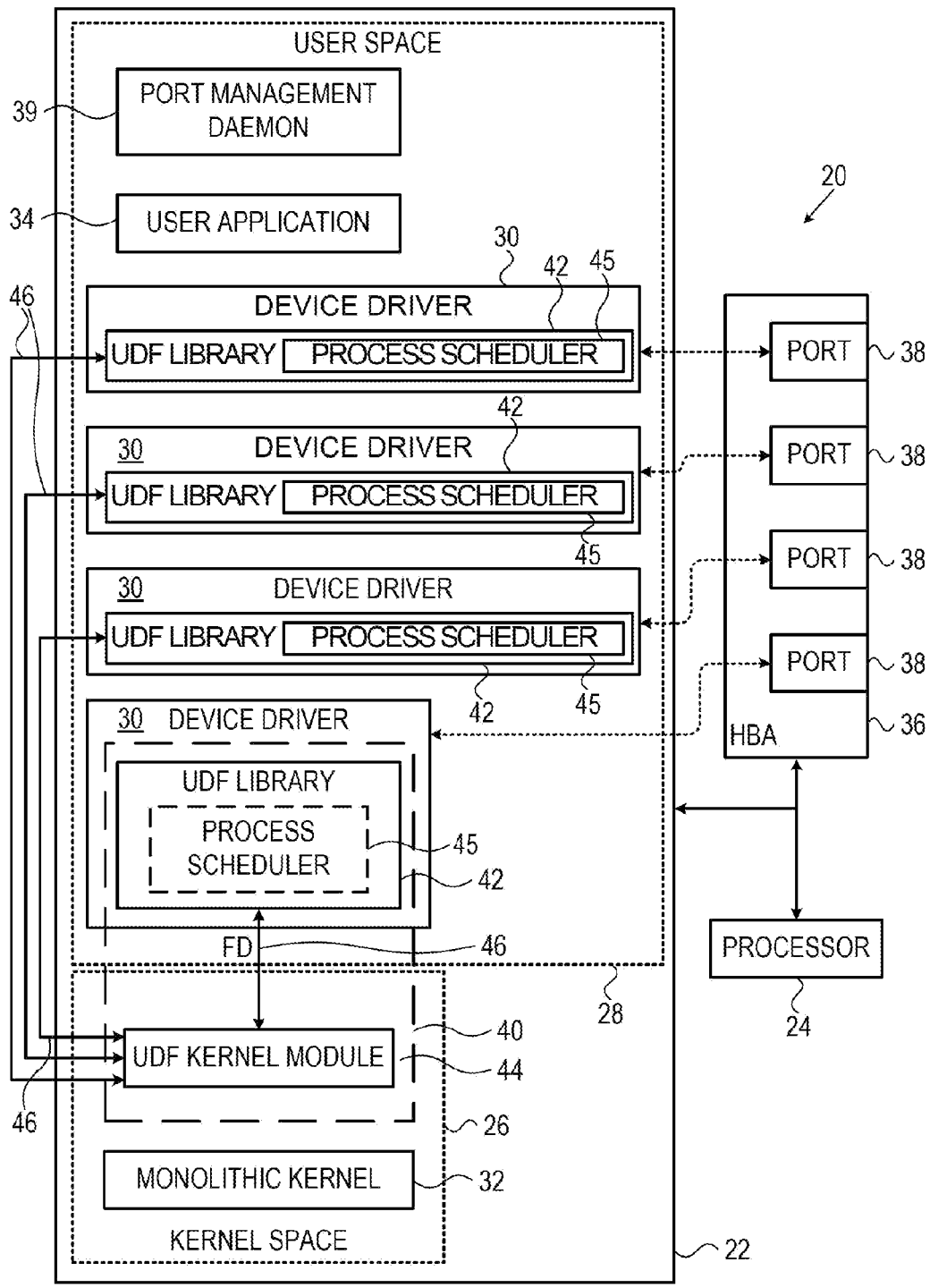
FIG. 1 is a block diagram of a computer system configured to execute device drivers as user mode processes, in accordance with an embodiment of the present invention.

Some operating systems such as Linux™, implement a monolithic kernel where the entire operating system executes from kernel space. In addition to the kernel, the operating system typically comprises kernel extensions and device drivers. A device driver is a software application that accepts a high-level command from a computer program (e.g., the kernel or a user application), and translates the high-level command to a series of low-level commands specific to a hardware device (e.g., a network interface controller).

During their execution, device drivers typically issue application programming interface (API) calls to the kernel. The API is an interface implemented in the kernel that enables the kernel to interact with other computer programs (e.g., device drivers and user applications). Computer programs issue API calls to gain access to and manage system resources.

Embodiments of the present invention provide methods and systems to enable device drivers to execute as user space processes in a monolithic kernel environment. More specifically, embodiments of the present invention enable device drivers executing from user space over a monolithic kernel to call kernel API functions. In some embodiments, an emulation layer executing over the monolithic kernel receives and processes an API call from a device driver executing from user space. The emulation layer replicates a subset of the kernel's API calls which are applicable to the device drivers. Since the emulation layer receives and processes kernel API calls, embodiments of the present invention enable existing device drivers to execute from user space with minimal modification.

If a device driver fails while executing from kernel space over a monolithic kernel, the failure of the device driver may cause the kernel to fail, thereby causing a system crash. Since embodiments of the present invention enable device drivers to execute from user space, kernel stability may be increased since a failure of a device driver (executing from user space) may only disable access to the device being controlled by the device driver.

In addition to executing device drivers from user space, embodiments of the present invention provide additional system stability by executing a separate instance (i.e., each instance executing as a separate process) of a device driver for each port of a same type in a computer system. For example, in a computer system comprising three network interface cards from a single vendor with four ports on each card, the kernel may execute twelve separate instances of an identical device driver, with each device driver dedicated to one of the twelve ports.

Since operating systems typically load and execute a single device driver for all devices of the same type, the device driver typically constitutes a single point of failure, i.e., a failure of the device driver disables access to all ports controlled by the device driver. By executing a separate instance of the device driver for each port, embodiments of the present invention increase system stability, since a failure of one of the device drivers only disables the single port controlled by the failed device driver.

System Description

FIG. 1 is a block diagram of a computer system 20 configured to execute device drivers as user mode processes, in accordance with an embodiment of the present invention. In the configuration shown in FIG. 1, computer system 20 comprises a memory 22 coupled to a processor 24. Memory 22 is divided into a kernel space 26 and a user space 28.

Processor 24 executes device drivers 30 from user space 28. Device drivers 30 accept high level commands from a monolithic kernel 32 and a user application 34, and translate the high level commands to a series of low level commands for a host bus adapter (HBA) 36, a hardware device which connects computer 20 to other network and storage devices (not shown). HBA 36 comprises hardware ports 38, where each of the ports is controlled by a separate instance of device drivers 30. A port manager daemon (i.e., a background process) 39, typically executing from user space 28, manages the relationships between device drivers 30 and ports 38 as described hereinbelow. While the configuration in FIG. 1 shows HBA 36 with hardware ports 38, other system configurations can also be employed to implement embodiments of the present invention, and are thus considered to be within the spirit and scope of this invention.

An emulation layer 40 in memory 22 is configured to accept kernel API calls from device drivers 30, and perform the requested kernel operation. The emulation layer comprises a user space driver framework (UDF) library 42 executing from the user space and a UDF kernel module 44 executing from the kernel space. In embodiments of the present invention, UDF library 42 is a component of device driver 30, and is configured to implement a subset of application programming interface (API) calls for kernel 32 that are applicable for managing Peripheral Component Interconnect (PCI) devices, such as HBA 36.

In the configuration shown in FIG. 1, emulation layer 40 comprises UDF kernel module 44 and UDF library 42 of the device driver directly above the UDF kernel module. Since there are four device drivers 30, there are actually four emulation layers 40. For simplicity, only one layer 40 is shown in the figure. The combination of UDF kernel module 44 and the UDF library for each device driver 30 comprises a separate emulation layer 40.

UDF library 42 is configured to implement API functions that can be run from user space 28. Examples of API functions that can be performed by UDF library 42 from user space 28 include managing lists, timers and a process scheduler (PS) 45. Lists typically store information such as message buffers to transfer to hardware devices such as HBA 36, and timers can be used to detect a situation where the HBA (or another hardware device) does not respond to a command, and therefore needs to be reset.

Process scheduler 45 typically schedules threads and interrupt handling code within its associated device driver 30, enabling the implementation of user-level threads. In computing, a thread is a component of a process in the sense that a single process (e.g., an instance of device driver 30 executing from user space 28) may comprise multiple threads, where all threads within the single process share the same state, share the same memory space, and communicate with each other directly.

UDF kernel module 44 is configured to implement API calls that are typically performed from kernel space 26, including mapping input output (I/O) memory addresses, allocating direct memory access (DMA) memory, and catching interrupts. Memory 22 comprises a file descriptor (FD) 46, which is a software mechanism that enables software processes, in this case UDF library 42 and UDF kernel module 44, to communicate with one another.

In computing, a privilege refers to a permission to perform a specific action. The monolithic kernel tasks performed by processor 24 are usually divided into privileged and non-privileged operations. Privileged operations typically have absolute control over critical system resources (e.g., memory and ports), as opposed to non-privileged operations which typically manage less critical system resources (e.g., timers and lists). In embodiments of the present invention, UDF kernel module 44 is configured to performed privileged operations, and UDF library 42 is configured to perform non-privileged operations.

When mapping I/O memory addresses (i.e., implementing memory mapped I/O), processor 24 assigns addresses in memory 22 to a device, such as HBA 36. Kernel 32 and user application 34 can then access HBA 36 by reading from or writing to the assigned memory addresses. When allocating DMA memory, processor 24 assigns addresses in memory 22 that are then used to transfer data directly between memory 22 and a device (e.g., HBA 36) without involving processor 24, thereby reducing processor overhead.

An interrupt typically comprises a signal that causes processor 24 to temporarily suspend execution of a program (e.g., a process of kernel 32 or user application 34). After detecting the interrupt, processor 24 may either resume executing the suspended program or start executing a different program (i.e., an application or a process). In general, there are hardware interrupts and software interrupts. A hardware interrupt occurs, for example, when an I/O operation is completed such as transferring data between HBA 36 and memory 22. A software interrupt occurs, for example, when user application 34 terminates or requests certain services from kernel 32.

In monolithic kernel environments, interrupts are typically handled from kernel space 26. In some embodiments of the present invention, upon detecting an interrupt, UDF kernel library 44 conveys a notification, via file descriptor 46, to UDF library 42 that there is an interrupt. Upon receiving the notification, scheduler 45 schedules execution of interrupt handling the device driver's interrupt handling code. The interrupt handling code is a component of device driver 30 configured to perform operations such as:

Receiving a notification of an incoming message from a remote network node. The interrupt handling code is configured to start processing the notification upon receipt of the notification.

Receiving a notification of a failure in firmware controlling HBA 36. The interrupt handling code is configured to reset HBA 36 upon receipt of the notification of failure.

Processor 24 typically comprises a general-purpose computer configured to carry out the functions described herein. Software operated by the processor may be downloaded to memory 22 in electronic form, over a network, for example, or it may be provided on non-transitory tangible media, such as optical, magnetic or electronic memory media. Alternatively, some or all of the functions of processor 24 may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Processing Kernel API Calls from User Space

Figure 2:
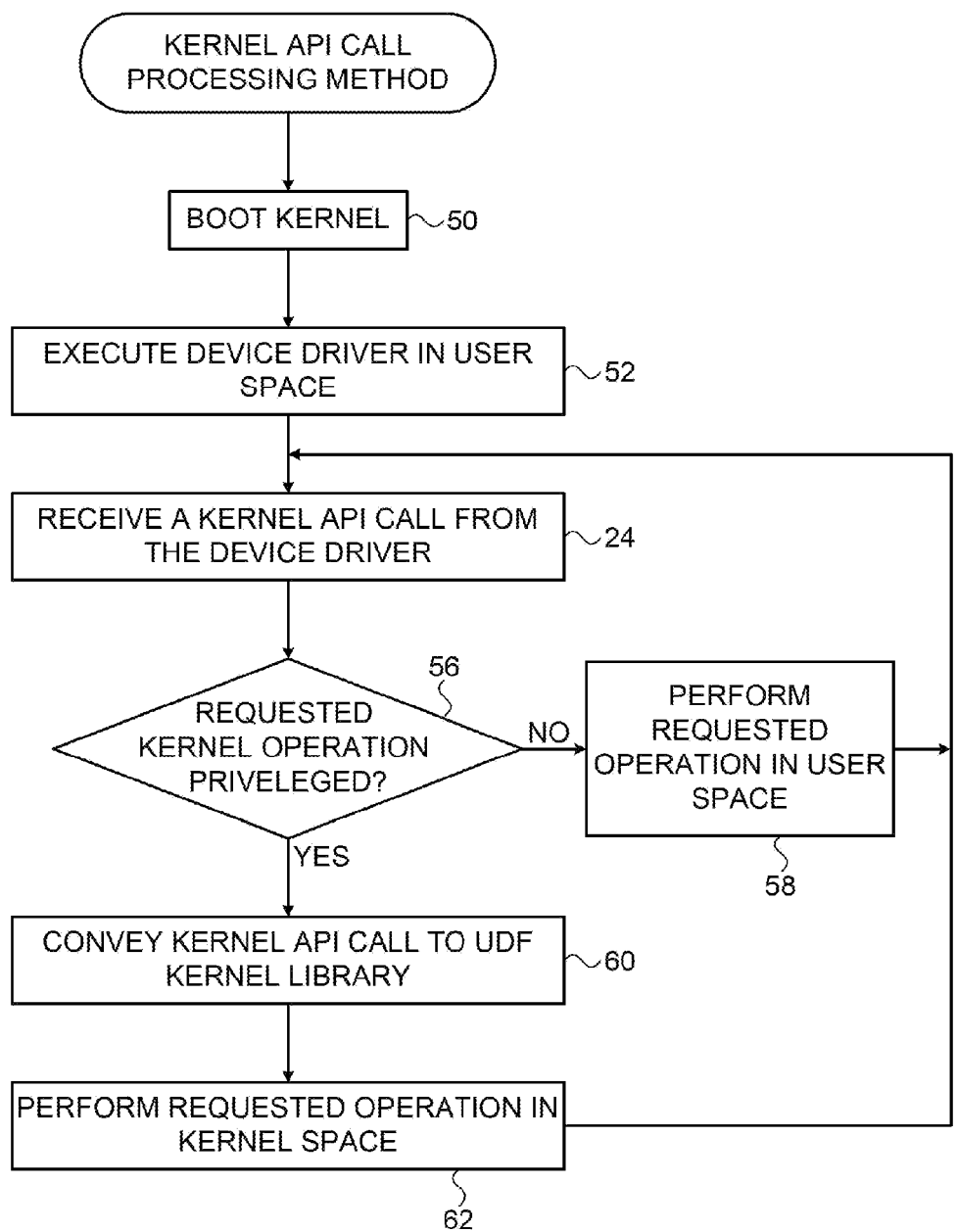
FIG. 2 is a flow diagram that schematically illustrates a method of processing a kernel application programming interface (API) call from a device driver executing as a user space process, in accordance with an embodiment of the present invention.

FIG. 2 is a flow diagram that schematically illustrates a method of processing a kernel API call from one of device drivers 30 executing as a process from user space 28, in accordance with an embodiment of the present invention. In a first step 50, processor 24 boots kernel 32, and in an execute step 52, processor 24 executes UDF library 42 and device drivers 30 from user space 28, and UDF kernel module 44 from kernel space 26.

In a receive step 54, UDF library 42 receives a kernel API call from its associated device driver 30. The device driver typically issues the API call after receiving a high level command from either kernel 32 or user application 34. In a comparison step 56, if the requested operation associated with the API call is not privileged, then in a first perform step 58, UDF library 42 performs the requested operation from user space 28, and the method continues with step 54. Returning to step 56, if the requested operation is privileged, then in a convey step 60, UDF library 42 conveys the API call to UDF kernel module 44 via file descriptor 46. In a second perform step 62, UDF kernel module 44 performs the requested operation from kernel space 26, conveys any necessary completion information back to UDF library 42 via file descriptor 46, and the method continues with step 54.

Device Driver Port Management

Figure 3:
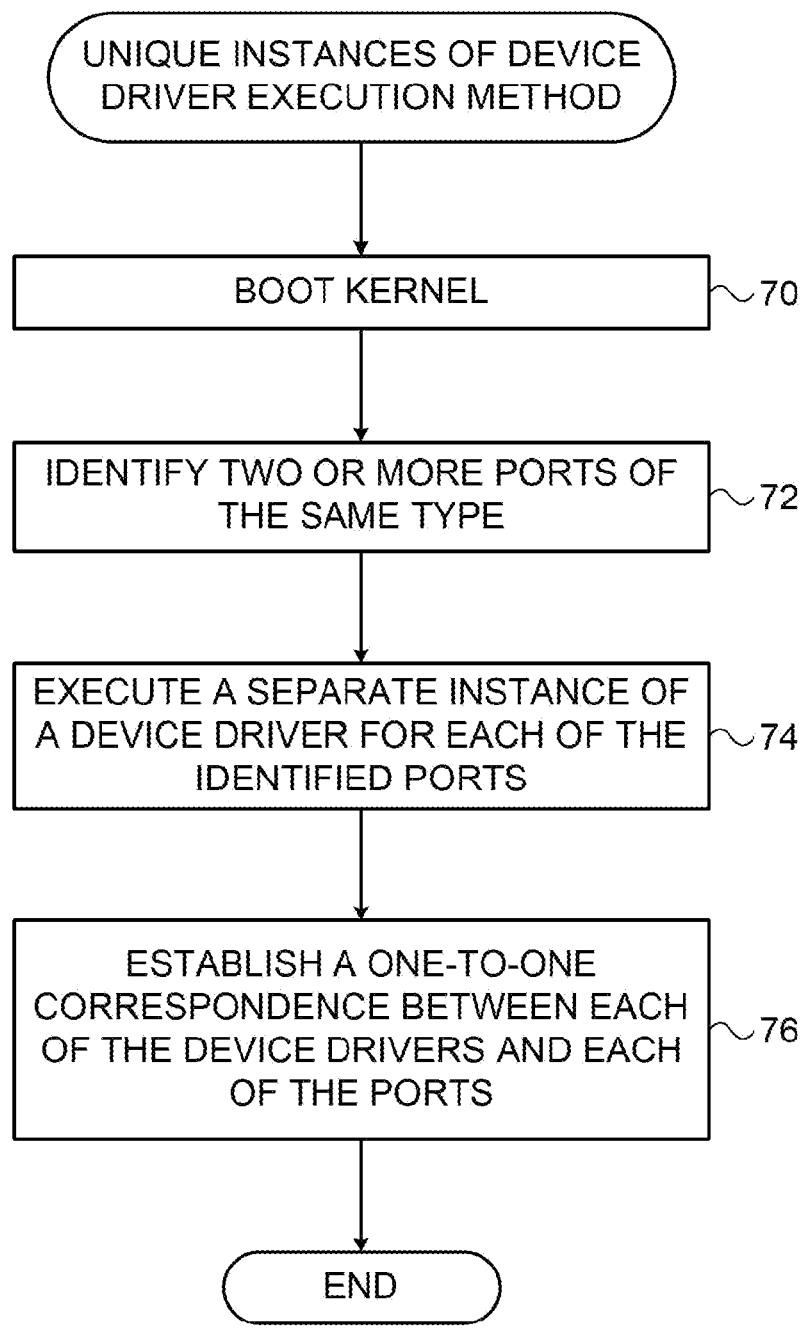
FIG. 3 is a flow diagram that schematically illustrates a method of executing a unique instance of a device driver for each port of the computer system, in accordance with an embodiment of the present invention.

FIG. 3 is a flow diagram that schematically illustrates a method of executing unique instances of device drivers 30 for each port 38, where each port 38 is a same type, in accordance with an embodiment of the present invention. In a first step 70, processor 24 boots kernel 32. While the computer system shown in FIG. 1 includes a monolithic kernel, processor 24 may boot a different type of kernel in step 70, including, but not limited to a hybrid kernel or a microkernel. In an identification step 72, port manager daemon 39 identifies two or more ports 38 of a same type. For example, ports 38 may be positioned on a single device, such as HBA 36. Additionally or alternatively, ports 38 may be physically positioned on multiple devices.

In an execute step 74, processor 24 executes, in memory 22, a separate instance of an identical device driver 30 for each of identified ports 38, where each instance is executed as a separate process from a unique address in memory 22. For example, in the computer system shown in FIG. 1, processor 24 executes four instances of the same HBA driver 30 for each HBA port 38, and executes each of the HBA drivers as a separate process.

Finally, in an establish step 78, processor 24 couples device drivers 30 to ports 38 and establishes a one-to-one correspondence between each of the device drivers and each of the ports, and the method terminates. As discussed supra, a failure of one of device drivers 30 only disables the port corresponding to the failed device driver. Typically, in the event of a failure of one of the device drivers, port manager daemon 39 detects and identifies the port associated with the failed device driver, re-launches the failed device driver as a new process, and couples the re-launched device driver to the identified port.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    receiving, by a user space driver framework (UDF) library executing from a user space of a memory over an operating system kernel operated by a device driver executing from the user space, a kernel application programming interface (API) call from a device driver executing from the user space;
    determining that the operation comprises a privileged operation, wherein if the operation is privileged:
        conveying, via a file descriptor, the API call to a UDF kernel module executing from a kernel space of the memory over the operating system kernel, and
        performing, by a kernel space emulation module, the privileged operation from the kernel space while conveying completion information back to the UDF library.

2. The method according to claim 1, further including a non-privileged operation.

3. The method according to claim 2, wherein the non-privileged operation is selected from a group of operations comprising maintaining a list, maintaining a timer, and maintaining a process scheduler.

4. The method according to claim 1, wherein the privileged operation is selected from a group of operations comprising catching an interrupt, allocating direct memory access (DMA) memory, and mapping input/output (I/O) memory addresses.

5. The method according to claim 1, wherein the device driver comprises a Peripheral Component Interconnect (PCI) device driver.

6. A computer program product, the computer program product comprising:
    a non-transitory computer readable storage medium having computer readable program code embodied therewith, the computer readable program code comprising:
        computer readable program code configured to receive, by a user space driver framework (UDF) library executing from a user space of a memory over an operating system kernel operated by a device driver executing from the user space, a kernel application programming interface (API) call from a device driver executing from the user space; and
        computer readable program code configured to determine that the operation comprises a privileged operation, wherein if the operation is privileged, the API call is conveyed, via a file descriptor, to a UDF kernel module executing from a kernel space of the memory over the operating system kernel, and the privileged operation is performed, by a kernel space emulation module, the privileged operation from the kernel space while conveying completion information back to the UDF library.

7. The computer program product according to claim 6, further including a non-privileged operation.

8. The computer program product according to claim 7, wherein the computer readable program code is configured to select the non-privileged operation from a group of operations comprising maintaining a list, maintaining a timer, and maintaining a process scheduler.

9. The computer program product according to claim 6, wherein the computer readable program code is configured to select the privileged operation from a group of operations comprising catching an interrupt, allocating direct memory access (DMA) memory, and mapping input/output (I/O) memory addresses.

10. The computer program product according to claim 6, wherein the device driver comprises a Peripheral Component Interconnect (PCI) device driver.

\* \* \* \* \*